United States Patent
Hariharan et al.

(10) Patent No.: US 7,428,729 B2
(45) Date of Patent: Sep. 23, 2008

(54) METHODS, SYSTEMS, AND COMPUTER PROGRAM PRODUCTS FOR INTEGRATING LEGACY APPLICATIONS INTO A PLATFORM-INDEPENDENT ENVIRONMENT

(75) Inventors: Rajaraman Hariharan, Chennai (IN); Ramakrishnan Kannan, Trichirappalli (IN)

(73) Assignee: International Business Machines Corporation, Armonk, NY (US)

( * ) Notice: Subject to any disclaimer, the term of this patent is extended or adjusted under 35 U.S.C. 154(b) by 913 days.

(21) Appl. No.: 10/769,435

(22) Filed: Jan. 30, 2004

(65) Prior Publication Data

US 2005/0172263 A1 Aug. 4, 2005

(51) Int. Cl.
*G06F 9/44* (2006.01)
(52) U.S. Cl. .................. 717/147; 717/118; 709/203
(58) Field of Classification Search ......... 709/201–203; 719/320; 717/118, 147, 148
See application file for complete search history.

(56) References Cited

U.S. PATENT DOCUMENTS

| | | | |
|---|---|---|---|
| 6,438,745 B1 | 8/2002 | Kanamaru et al. | 717/137 |
| 7,039,919 B1* | 5/2006 | Hunt | 719/316 |
| 2002/0052977 A1 | 5/2002 | Stall | 709/313 |
| 2002/0066084 A1 | 5/2002 | Sobeski et al. | 717/137 |
| 2002/0066085 A1 | 5/2002 | Nowlin, Jr. et al. | 717/137 |
| 2002/0069123 A1 | 6/2002 | Soderlind et al. | 705/26 |
| 2002/0092000 A1 | 7/2002 | Srinivasan et al. | 717/136 |
| 2002/0147962 A1* | 10/2002 | Hatanaka | 717/102 |
| 2002/0178170 A1 | 11/2002 | Britton et al. | 707/100 |
| 2002/0178290 A1* | 11/2002 | Coulthard et al. | 709/246 |
| 2003/0046639 A1 | 3/2003 | Fai et al. | 715/513 |
| 2003/0046669 A1 | 3/2003 | Mohamed et al. | 717/136 |
| 2003/0063119 A1 | 4/2003 | Bloomfield et al. | 345/738 |
| 2003/0105887 A1 | 6/2003 | Cox et al. | 709/328 |
| 2003/0110313 A1 | 6/2003 | Dochez et al. | 709/328 |

FOREIGN PATENT DOCUMENTS

| | | |
|---|---|---|
| WO | WO 01/33387 A2 | 5/2001 |
| WO | WO 01/33387 A3 | 5/2001 |

OTHER PUBLICATIONS

Mondal et al. "Choosing a Middleware for Web-Integration of a Legacy Application," *Software Engineering Notes*. vol. 25, No. 3, May 2000, pp. 50-53.
Medjahed et al. "Business-to-Business Interactions: Issues and Enabling Technologies," *The VLDB Journal*. vol. 12, 2003, pp. 59-85.
Friesen, Geoff, "The Win32-Java hybrid," IBM, Jul. 1, 1999.

* cited by examiner

*Primary Examiner*—David Lazaro
(74) *Attorney, Agent, or Firm*—Dillon & Yudell LLP

(57) ABSTRACT

A portable executable (PE) is invoked through a platform-independent interface by processing an export table in the PE to obtain the function names used in the PE. A resources table in the PE is processed to obtain a user interface used in the PE. A platform-independent user interface is generated based on the user interface used in the PE. At least one of the functions used in the PE is invoked through the platform-independent user interface.

5 Claims, 4 Drawing Sheets

METHODS, SYSTEMS, AND COMPUTER PROGRAM PRODUCTS FOR INTEGRATING LEGACY APPLICATIONS INTO A PLATFORM-INDEPENDENT ENVIRONMENT

FIELD OF THE INVENTION

The present invention relates to legacy applications, and, more particularly, to integrating legacy applications into a platform-independent environment.

BACKGROUND OF THE INVENTION

Because of the ubiquitous nature of Microsoft applications in many computing environments, there is a large embedded base of Windows-based executables. Unfortunately, as hardware and software platforms continue to age, customers may avoid upgrading to newer technology because of their extensive investment in Windows-based applications and executables. Specifically, it may be difficult or not even possible to migrate these Windows-based applications and executables to a newer, more modern platform.

SUMMARY

According to some embodiments of the present invention, a portable executable (PE) is invoked through a platform-independent interface by processing an export table in the PE to obtain the function names used in the PE. A resources table in the PE is processed to obtain a user interface used in the PE. A platform-independent user interface is generated based on the user interface used in the PE. At least one of the functions used in the PE is invoked through the platform-independent user interface.

In other embodiments of the present invention, the export table is processed to determine numbers of push calls before calls to the functions to determine numbers of parameters associated with the functions, respectively.

In still other embodiments of the present invention, data associated with parameters associated with the at least one of the functions used in the PE is received through the platform-independent user interface. The at least one of the functions used in the PE is invoked with the received parameters through the platform-independent interface.

In further embodiments of the present invention, the platform-independent user interface is a Java interface.

In still further embodiments of the present invention, the at least one of the functions used in the PE is invoked through a Java Native Interface (JNI).

In still further embodiments of the present invention, the platform-independent user interface further comprises a hypertext markup language (HTML) and/or an XForms interface.

Although described primarily above with respect to method aspects of the present invention, it will be understood that the present invention may also be embodied as systems and computer program products.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1:
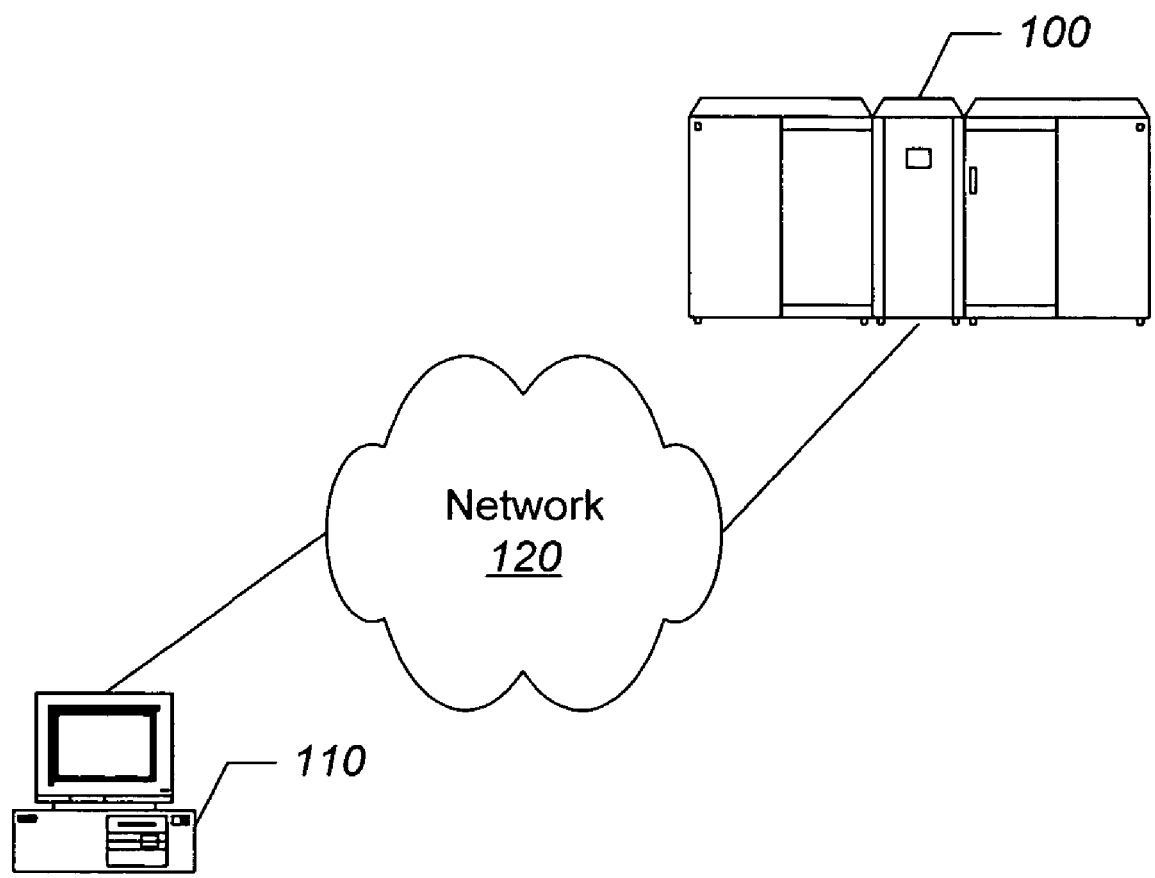
FIG. 1 is a block diagram that illustrates a communication network for integrating legacy applications into a platform-independent environment in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

The present invention is described herein in the context of integrating legacy applications into a Java Operating System based environment. It will be understood that the present invention is not limited to Java-based environments, but is applicable to any platform-independent data processing environment.

The present invention may be embodied as methods, systems, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, or store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device, or propagation medium. More specific examples (a nonexhaustive list) of the computer-readable storage medium would include the following: a portable computer diskette, a random access memory (RAM), a read-only memory (ROM), an erasable programmable read-only memory (EPROM or Flash memory), and a portable compact disc read-only memory (CD-ROM). More specific examples (a nonexhaustive list) of the computer-readable medium would include the following: an electrical connection having one or more wires and an optical fiber. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

FIG. 1 is a block diagram that illustrates a communication network for integrating legacy applications into a platform-independent environment in accordance with some embodiments of the present invention. As shown in FIG. 1, the communication network comprises a Web server data processing system 100 that is configured to communicate with a computer or terminal 110 via a network 120. The network 120 may comprise, for example, the Internet, a wide area network, a local area network, and/or combinations of such networks. In accordance with some embodiments of the present invention, the computer or terminal 110 may communicate with the Web server data processing system 100 in accordance with a client-server protocol.

Although FIG. 1 illustrates an exemplary communication network for integrating legacy applications into a platform-independent environment in accordance with some embodiments of the present invention, it will be understood that the present invention is not limited to such a configuration but is intended to encompass any configuration capable of carrying out operations described herein.

Figure 2:
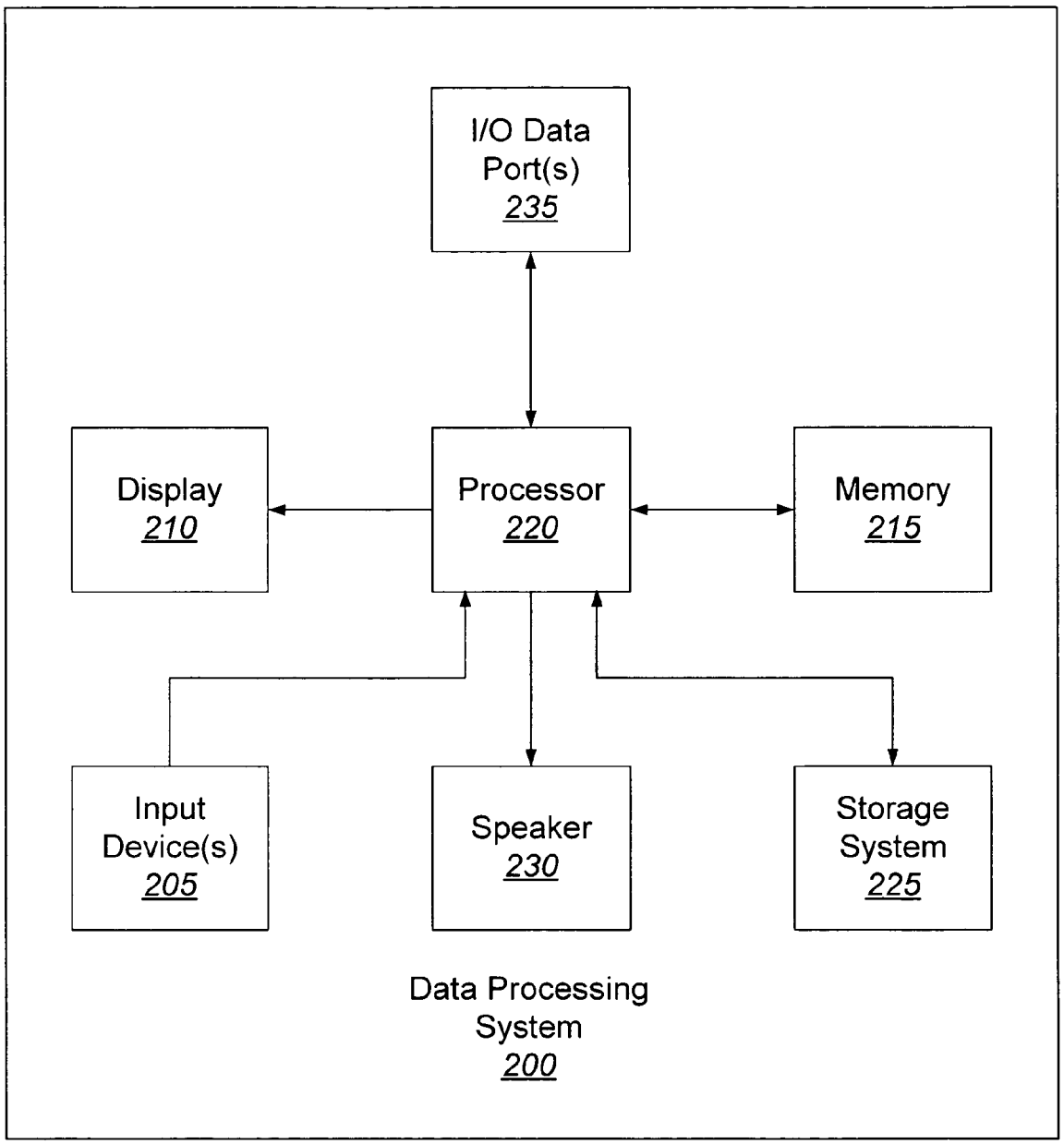
FIG. 2 is a block diagram that illustrates a Web server data processing system in accordance with some embodiments of the present invention.

FIG. 2 illustrates a Web server data processing system 200 in accordance with some embodiments of the present invention. The Web server data processing system 200 comprises input device(s) 205, such as a keyboard or keypad, a display 210, and a memory 215 that communicate with a processor 220. The data processing system 200 may further comprise a storage system 225, a speaker 230, and an I/O data port(s) 235 that also communicate with the processor 220. The storage system 225 may include removable and/or fixed media, such as floppy disks, ZIP drives, hard disks, or the like as well as virtual storage such as a RAMDISK. The I/O data port(s) 235 may be used to transfer information between the data processing system 200 and another computer system or a network (e.g., the Internet). These components may be conventional components, such as those used in many conventional computing devices, and their functionality, with respect to conventional operations, is generally known to those skilled in the art.

Figure 3:
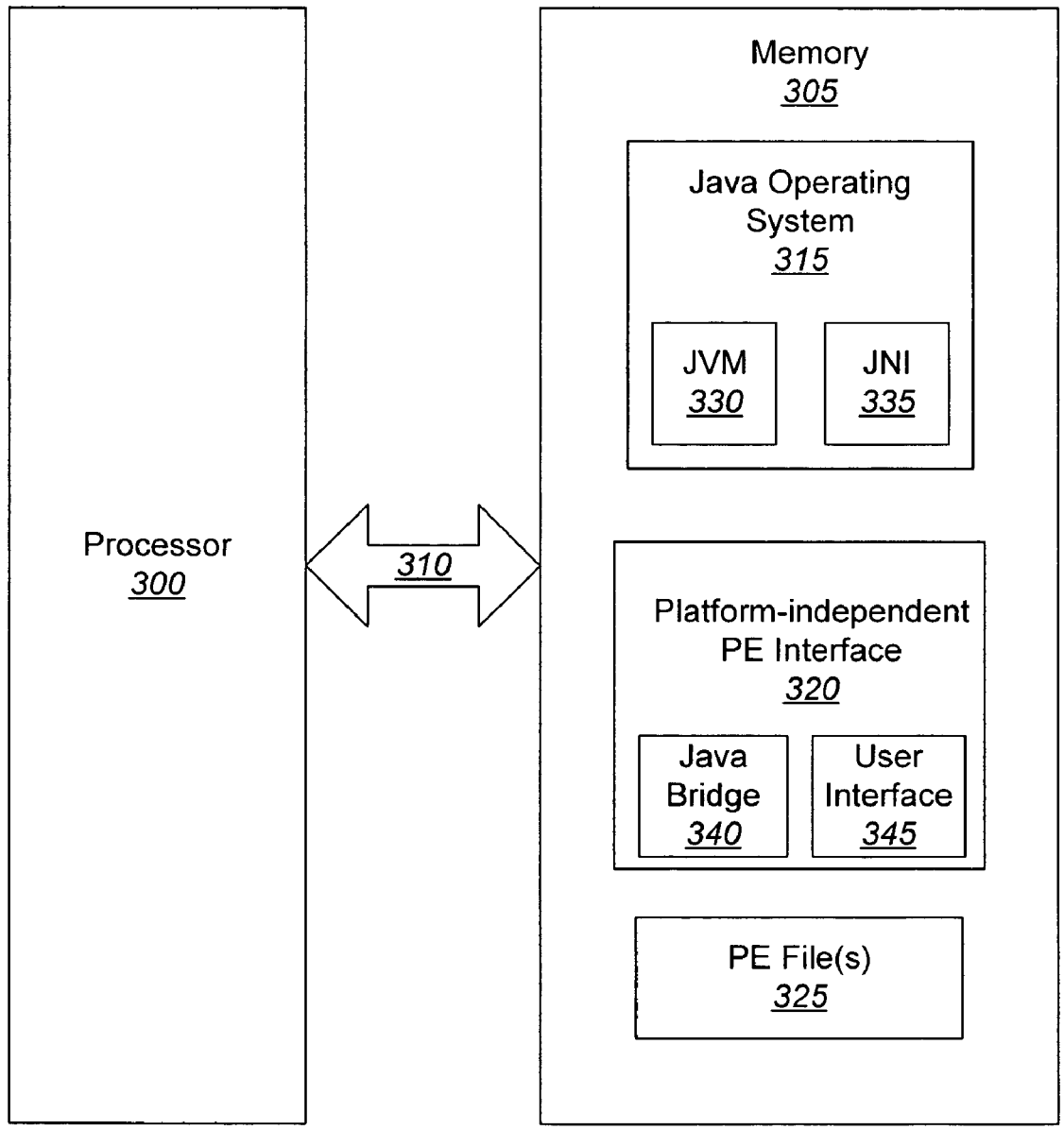
FIG. 3 is a block diagram that illustrates a software/hardware architecture for use in a data processing system for integrating legacy applications into a platform-independent environment in accordance with some embodiments of the present invention.

FIG. 3 illustrates a processor 300 and memory 305 that may be used in embodiments of Web server data processing systems, such as the data processing system 200 of FIG. 2, for integrating legacy applications into a platform-independent environment in accordance with some embodiments of the present invention. The processor 300 communicates with the memory 305 via an address/data bus 310. The processor 300 may be, for example, a commercially available or custom microprocessor. The memory 305 is representative of the one or more memory devices containing the software and data used to facilitate integration of legacy applications into a platform-independent environment in accordance with some embodiments of the present invention. The memory 305 may include, but is not limited to, the following types of devices: cache, ROM, PROM, EPROM, EEPROM, flash, SRAM, and DRAM.

As shown in FIG. 3, the memory 305 may contain up to three or more categories of software and/or data: a Java operating system 315, a platform-independent interface module 320, and one or more Portable Executable (PE) files 325. The PE file format is one type of file format Microsoft has developed for Windows 16-bit and 32-bit application executables. The Java operating system 315, which has been developed by Sun Microsystems, Mountain View, Calif., may manage the data processing system's software and/or hardware resources and may coordinate execution of programs by the processor 300. Java is a portable and architecturally neutral language. Java source code is compiled into a machine independent format that may be run on machines configured with a Java runtime system known as a Java Virtual Machine (JVM) module 330. The JVM is defined as an imaginary machine that is implemented by emulating a processor through the use of software on a real machine. Accordingly, machines running under diverse operating systems, including UNIX and Windows NT, having a JVM can execute the same Java program. The Java operating system 315 may further comprise a Java Native Interface (JNI) module 335. The JNI module 325 may allow Java code that runs within the JVM module 330 to operate with applications and libraries written in other languages, such as, for example, C, C++, and assembly.

The platform-independent PE interface module 320 may be configured to facilitate the integration of legacy applications into a platform-independent environment in accordance with some embodiments of the present invention. As shown in FIG. 3, the platform-independent PE interface module 320 comprises a Java bridge module 340 and a user interface module 345. The Java bridge module 340 may be configured to process a PE file to obtain function names used in the PE. As shown below in Table 1, a PE file includes the following tables or components:

| PE File Component | Description |
| --- | --- |
| .text | The default section for code. |
| .data | The default read/write data section. Global variables typically go here. |
| .idata | This section contains information about imported functions and data. |
| .edata | This section contains information about exported functions and data. |
| .rsrc | This section contains information about raw resource data, such as icons, bitmaps, and dialogs. |

Thus, the Java bridge module 340 may be configured to process the .edata table in a PE file to obtain the function names used in the PE. The user interface module 345 may be configured to process the .rsrc table in a PE file to obtain the user interface used in the PE. Operations for invoking a legacy PE through the platform-independent PE interface will now be described.

Although FIG. 3 illustrates an exemplary hardware/software architecture that may be used in Web server data processing systems, such as the Web server data processing system 200 of FIG. 2 and/or the Web server 100 of FIG. 1, for integrating legacy applications, such as PEs, into a platform-independent environment, it will be understood that the present invention is not limited to such a configuration but is intended to encompass any configuration capable of carrying out operations described herein. Moreover, the functionality of the data processing system 200 of FIG. 2 and the hardware/software architecture of FIG. 3 may be implemented as a single processor system, a multi-processor system, or even a network of stand-alone computer systems, in accordance with various embodiments of the present invention.

Computer program code for carrying out operations of data processing systems discussed above with respect to FIG. 3 may be written in a high-level programming language, such as Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described herein with reference to flowchart and/or block diagram illustrations of methods, systems, and computer program products in accordance with exemplary embodiments of the invention. These flowchart and/or block diagrams further illustrate exemplary operations for integrating legacy applications into a platform independent environment, in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 4:
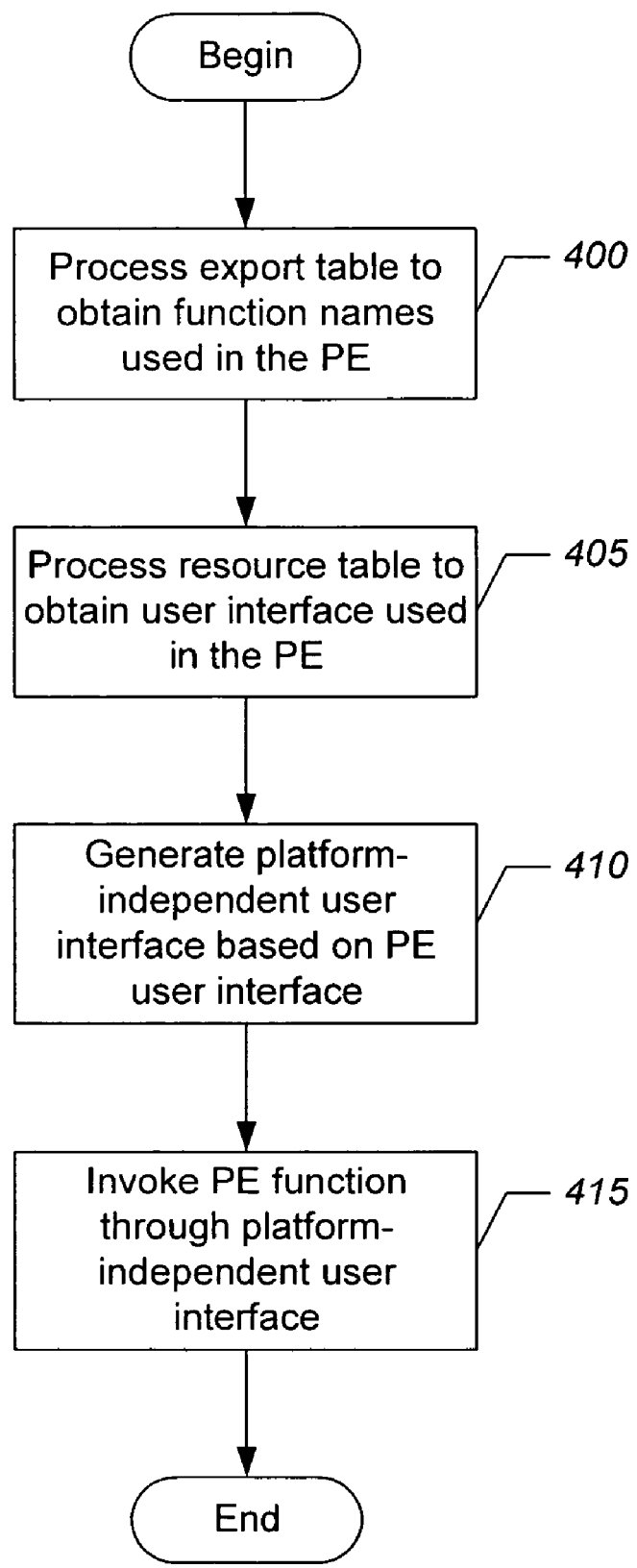
FIG. 4 is a block diagram that illustrates operations for integrating legacy applications into a platform independent environment in accordance with some embodiments of the present invention.

Referring now to FIG. 4 and with frequent reference to FIG. 3, exemplary operations for integrating legacy applications into a platform independent environment, in accordance with some embodiments of the present invention, will now be described. Operations begin at block 400 where the Java bridge module 340 processes the .edata table of a PE file to obtain the function names used in the PE. In accordance with some embodiments of the present invention, the Java bridge module 340 may analyze the .edata table to determine the number of push calls before the calls to the functions to determine the number of parameters that are associated with the various functions in the PE.

At block 405, the user interface module 345 processes the .rsrc table of the PE file to obtain the user interface used in the PE. The typical resources for a Windows application are menus, dialogs, icons, string tables, and version information. Each of these resources has its own individual format. Thus, the user interface module 345 may determine the user interface used in the PE through examination of the .rsrc table and may then use this information to generate a platform-independent interface, such as, for example, a hyptertext markup language (HTML) or XForms interface at block 410.

Operations continue at block 415 where one or more PE functions may be invoked through the platform-independent interface 320. In particular, the user interface module 345 may receive data associated with the parameters associated with one of the PE functions through the platform-independent user interface generated at block 410. These parameters may then be passed to the function whose name has been determined by the Java bridge module 340 through the JNI module 335.

Advantageously, a legacy executable, such as a PE, may be invoked through a platform-independent interface that is based on, for example, the Java operating system. This may allow data processing system operators to migrate their hardware and software platforms to newer technologies without having to forego their investment in legacy applications and executables.

The flowchart of FIG. 4 illustrates the architecture, functionality, and operations of some embodiments of methods, systems, and computer program products for integrating legacy applications into a platform independent environment. In this regard, each block represents a module, segment, or portion of code, which comprises one or more executable instructions for implementing the specified logical function(s). It should also be noted that in other implementations, the function(s) noted in the blocks may occur out of the order noted in FIG. 4. For example, two blocks shown in succession may, in fact, be executed substantially concurrently or the blocks may sometimes be executed in the reverse order, depending on the functionality involved.

Many variations and modifications can be made to the preferred embodiments without substantially departing from the principles of the present invention. All such variations and modifications are intended to be included herein within the scope of the present invention, as set forth in the following claims.

That which is claimed:

1. A method of invoking a portable executable (PE) through a platform-independent interface, comprising:
   processing an export table in the PE to obtain the function names used in the PE, wherein processing the export table comprises processing the export table in the PE to determine numbers of push calls before calls to the functions to determine numbers of parameters associated with the functions respectively;
   processing a resources table in the PE to obtain a user interface used in the PE;
   generating a platform-independent user interface based on the user interface used in the PE; and
   invoking at least one of the functions used in the PE through the platform-independent user interface.

2. The method of claim 1, wherein invoking the at least one of the functions used in the PE through the platform-independent user interface comprises:
   receiving data associated with parameters associated with the at least one of the functions used in the PE through the platform-independent user interface; and
   invoking the at least one of the functions used in the PE with the parameters associated with the at least one of the functions used in the PE through the platform-independent interface.

3. The method of claim 1, wherein the platform-independent user interface is a Java interface.

4. The method of claim 3, wherein invoking at least one of the functions used in the PE comprises:
   invoking the at least one of the functions used in the PE through a Java Native Interface.

5. The method of claim 3, wherein the platform-independent user interface further comprises a hypertext markup language (HTML) and/or an XForms interface.

* * * * *